(12) United States Patent
Tanaka

(10) Patent No.: US 8,462,259 B2
(45) Date of Patent: Jun. 11, 2013

(54) FOCUSING IMAGE DISPLAY DEVICE AND METHOD FOR DISPLAYING SAME

(75) Inventor: Hiroyuki Tanaka, Tokyo (JP)

(73) Assignee: Pentax Ricoh Imaging Company, Ltd., Tokyo (JP)

( * ) Notice: Subject to any disclaimer, the term of this patent is extended or adjusted under 35 U.S.C. 154(b) by 1 day.

(21) Appl. No.: 13/226,729

(22) Filed: Sep. 7, 2011

(65) Prior Publication Data

US 2012/0057065 A1 Mar. 8, 2012

(30) Foreign Application Priority Data

Sep. 8, 2010 (JP) ................................. 2010-200880

(51) Int. Cl.
*H04N 13/00* (2006.01)
*H04N 5/222* (2006.01)
*G06K 9/40* (2006.01)
*G06K 9/00* (2006.01)
*G06K 9/32* (2006.01)

(52) U.S. Cl.
USPC ........... 348/345; 348/349; 348/347; 348/353; 348/333.11; 382/255; 382/299; 382/148; 382/274

(58) Field of Classification Search
USPC .................... 348/345–356, 208.12, 326, 745, 348/14.12, 208.13, 333.01, 333.11, E13.01, 348/7, 365; 382/210, 191, 148, 255, 274, 382/263, 264, 299
See application file for complete search history.

(56) References Cited

U.S. PATENT DOCUMENTS

| 7,911,527 B2* | 3/2011 | Pan .............................. 348/353 |
| 8,018,524 B2* | 9/2011 | Kawarada ..................... 348/350 |
| 2001/0012072 A1* | 8/2001 | Ueno ....................... 348/333.02 |

FOREIGN PATENT DOCUMENTS

| JP | 09294224 A | * 11/1997 |
| JP | 2004-242010 A | 8/2004 |
| JP | 2004242010 A | * 8/2004 |

OTHER PUBLICATIONS

U.S. Appl. No. 13/156,611 to Yoshitaka Kimura et al., which was filed on Jun. 9, 2011.
U.S. Appl. No. 13/226,719 to Hiroyuki Tanaka et al., which was filed on Sep. 7, 2011.
U.S. Appl. No. 13/226,738 to Hiroyuki Tanaka et al., which was filed on Sep. 7, 2011.
U.S. Appl. No. 13/226,703 to Hiroyuki Tanaka et al., which was filed on Sep. 7, 2011.

* cited by examiner

*Primary Examiner* — Nhan T Tran
*Assistant Examiner* — Marly Camargo
(74) *Attorney, Agent, or Firm* — Greenblum & Bernstein P.L.C.

(57) ABSTRACT

A focusing image display device is equipped with an autofocus processor, a spatial frequency detector, a magnification determiner and a focusing image display processor. The autofocus processor performs an autofocus operation using an image within a partial area of an effective pixel area. The spatial frequency detector calculates a spatial frequency of a focusing image within the partial area after the autofocus operation is completed. The magnification determiner determines the magnification of the focusing image in accordance to the spatial frequency. The focusing image display processor modifies the resolution of the focusing image with respect to the magnification.

6 Claims, 3 Drawing Sheets

FOCUSING IMAGE DISPLAY DEVICE AND METHOD FOR DISPLAYING SAME

BACKGROUND OF THE INVENTION

1. Field of the Invention

The present invention relates to a device for displaying a focusing image on a monitor of a digital camera and a method thereof.

2. Description of the Related Art

A contrast-detect autofocus (AF) function has been employed by various types of digital cameras where, in general, a focusing image is temporarily displayed on a monitor of the camera for a photographer to check whether or not the image is adequately in focus. However, the size of the monitor provided on the camera is usually not sufficient for a photographer to verify the quality or conditions of the focusing image when the entire image is represented on the display. In order to overcome such problems, a camera disclosed in KOKAI 2004-242010 enlarges an area with the highest degree of focusing and further indicates a subarea within the enlarged image having the highest focusing degree by framing the subarea.

SUMMARY OF THE INVENTION

However, since there are many different types of photography, such as portrait photography, landscape photography and so on, a preferred magnification of the focusing image depends on the particular type of the subject being photographed.

Therefore, one aspect of the present invention is to accommodate the magnification of a focusing image based on the type of the subject being photographed.

According to the present invention, a focusing image display device is provided that comprises an autofocus processor, a spatial frequency detector, a magnification determiner and a focusing image display processor.

The autofocus processor performs an autofocus operation using an image within a partial area of an effective pixel area. The spatial frequency detector calculates a spatial frequency of a focusing image within the partial area after the autofocus operation is completed. The magnification determiner determines a magnification of the focusing image in accordance with the spatial frequency. The focusing image display processor modifies the resolution of the focusing image based on its magnification.

According to another aspect of the present invention, a digital camera is provided that comprises the autofocus processor, the spatial frequency detector, the magnification determiner and the focusing image display processor.

Further, according to another aspect of the present invention, a method for displaying a focusing image is provided that includes carrying out an autofocus operation using an image within a partial area of an effective pixel area, calculating a spatial frequency of a focusing image within the partial area after the autofocus operation is completed, determining the magnification of the focusing image in accordance to the spatial frequency, and modifying the resolution of the focusing image with respect to its magnification.

BRIEF DESCRIPTION OF THE DRAWINGS

The objects and advantages of the present invention will be better understood from the following description, with reference to the accompanying drawings in which.

DESCRIPTION OF THE PREFERRED EMBODIMENTS

Figure 1:
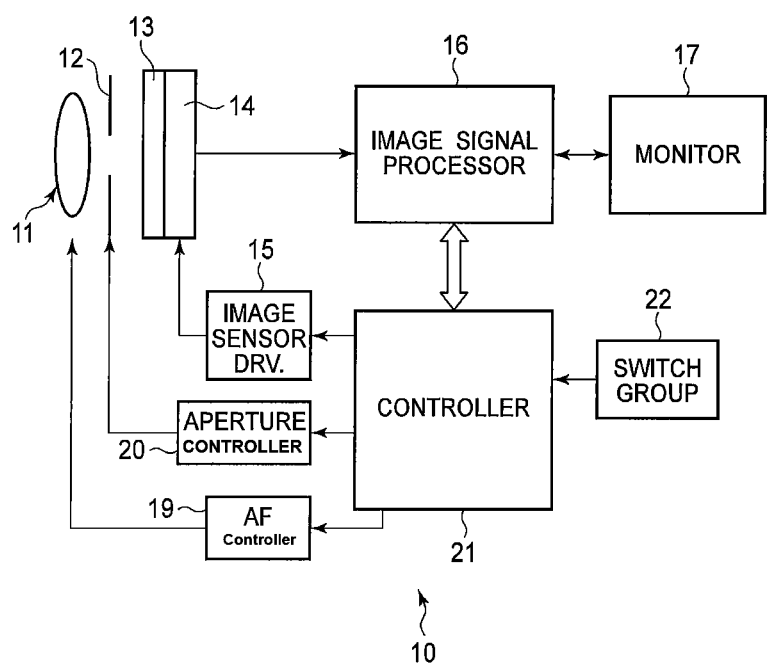
FIG. 1 is a block diagram schematically illustrating the general structure of a digital camera of an embodiment of the present invention.

The present invention is described below with reference to the embodiments shown in the drawings.

FIG. 1 is a block diagram schematically illustrating the general structure of a digital camera to which an embodiment of the present invention is applied.

The digital camera 10, for example, is a digital single-lens reflex camera. Light made incident to a lens system 11 forms an image on an imaging surface of an image sensor 14 (e.g., a CMOS image sensor) through an aperture 12 and a color filter array 13. The image sensor 14 may be controlled by drive signals from an image sensor driver 15. Image signals obtained by the image sensor 14 may be fed to an image signal processor 16 to be subjected to various types of image signal processing that are well known in the art, and in turn, the image may be displayed on a monitor 17.

An AF controller 19 may control the positions of the lenses in the lens system 11 to carry out the autofocus operation. Further, an aperture controller 20 may control the size of the aperture 12. Note that the image sensor driver 15, the AF controller 19 and the aperture controller 20 are controlled by instructions from a controller 21, and the controller 21 may perform various types of processes, including the autofocus operation (detailed later), based on the manipulation of switches in a switch group 22. The switch group 22 may include a release switch, AF button, dial switches, a touch panel, etc.

With references to FIGS. 2A, 2B and 3, an outline of a focusing-image display verification method for the present embodiment will be explained. Note that in the present embodiment a contrast-detect autofocus (CAF) operation is applied.

Figure 2A:
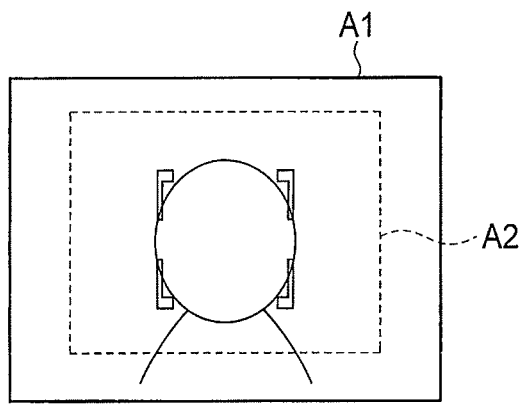
FIGS. 2A and 2B show two typical images having different spatial frequencies and their respective areas that are used in the autofocus operation.
Figure 2B:
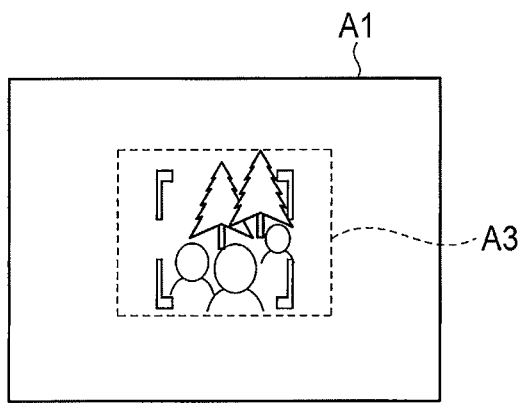
Figure 3:
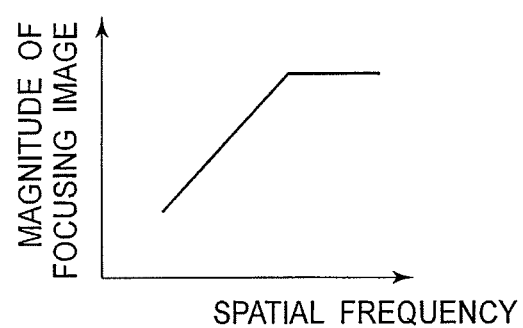
FIG. 3 is a graph representing the relationship between the spatial frequency and a magnification of the focusing image displayed for verification.

FIGS. 2A and 2B represent captured images of two dissimilar types of objects having different spatial frequencies. In FIGS. 2A and 2B, CAF areas A2 and A3 are indicated within an actual pixel area (or an effective pixel area) A1, and are used in a CAF operation to compare the contrast between them. In FIG. 2A, a person's face in large scale is positioned at the center of the image. On the other hand, in FIG. 2B, three people are imaged with distant background view. In general, images of the type in FIG. 2B have higher spatial frequency compared to images of the type in FIG. 2A, which makes it relatively difficult to verify the focusing degree of an image having a high spatial frequency like the one in FIG. 2B.

Therefore, in the present embodiment a focusing image within the CAF area is magnified with the focus point at its center and displayed on the monitor 17 (see FIG. 1) after the CAF operation is completed, with the magnification being controlled in accordance to the spatial frequency within the CAF area. The relationship between the spatial frequency and the magnitude of the present embodiment is represented in the graph of FIG. 3. Namely, in the present embodiment, a focusing image is enlarged by a greater magnification as the spatial frequency is increased for display on the monitor 17. Note that as in the example indicated in FIG. 3, in a lower spatial frequency band the magnification linearly increases as the spatial frequency increases until it surpasses a predetermined spatial frequency, at which point the magnification is sustained at a constant (the maximum magnification). However, the relationship between the spatial frequency and the magnification is not restricted to the present example. Further, the focusing image may be larger than the CAF area, such that an area surrounding the CAF area may be included.

Next with reference to the flowchart of FIG. 4, a focusing-image display operation of the present embodiment will be explained. Note that the focusing-image display operation is carried out mainly by the controller 21 (see FIG. 1).

Figure 4:
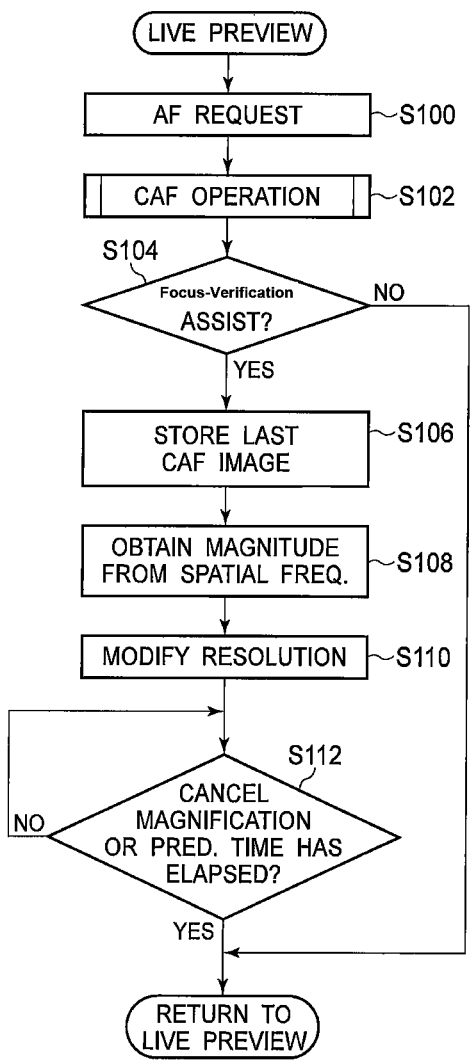
FIG. 4 is a flowchart showing the processes for the CAF operation and a display operation for the focusing image.

The operations indicated in FIG. 4 are carried out when a through-the-lens image (live preview) is displayed on the monitor. When an AF request is detected in Step S100, a CAF operation is initiated in Step S102. Namely, a CAF operation is carried out in cooperation with the AF controller 19 by comparing the contrast between images captured successively within the CAF area (see FIG. 1).

When the CAF operation of Step S102 is completed, whether or not a request for a focus-verification assist has been detected is determined in Step S104. The focus-verification assist request designates whether or not to perform the above-mentioned magnifying control while a focusing image is displayed. For example, whether the request exists is determined by whether or not the focus-verification assist mode has been preset by a user.

When it is determined that the focus-verification assist request does not exist, this process is immediately terminated and the normal through-the-lens operation or live preview starts. However when it is determined that the focus-verification assist request exists, the last image within the CAF area during the CAF operation of Step S102 is stored in memory (not shown) at Step S106. The spatial frequency of the image stored in memory is then calculated and, for example, a magnification to the size of the through-the-lens image is determined with reference to a lookup table that corresponds to the graph in FIG. 3 in Step S108.

In Step S110 the resolution of an image of the CAF area, which is stored in the memory, is modified based on the magnification obtained in Step S108 and, in turn, the image is magnified and displayed on the monitor 17 (see FIG. 1). In Step S112, a determination is made as to whether or not either the display of the focusing image on the monitor 17 has been canceled or a predetermined time has elapsed from the beginning of the display of the focusing image. The representation may be cancelled by the manipulation of a predetermined button (not shown) included in the switch group 22 and, for example, the predetermined time may be preset to approximately 2 seconds.

The determination of Step S112 is repeated until either the display of the focusing image has been cancelled or the predetermined time has elapsed. When either one of these events occurs the focusing-image display operation is completed and the normal through-the-lens image display or live preview resumes.

As described above, according to the present embodiment, a focusing image can be enlarged at an appropriate magnification associated with the spatial frequency of an object image and displayed on a monitor.

Note that only the pixel signals from the CAF area within the effective pixel area may be read out to perform an accelerated CAF operation. Further, this CAF operation and method of displaying the focusing-image in this invention may be combined, such that the size of a focusing-image displayed on the monitor may be determined from the spatial frequency of the CAF area.

Further, although the present embodiment has been described for a single-lens reflex camera, the present invention is not restricted to a digital camera and may also be applied to a device, including a cell phone and the like, which is provided with a digital camera.

Although the embodiment of the present invention has been described herein with reference to the accompanying drawings, obviously many modifications and changes may be made by those skilled in this art without departing from the scope of the invention.

The present disclosure relates to subject matter contained in Japanese Patent Application No. 2010-200880 (filed on Sep. 8, 2010), which is expressly incorporated herein, by reference, in its entirety.

The invention claimed is:

1. A focusing image display device, comprising:
    an autofocus processor that performs an autofocus operation using an image within a partial area of an effective pixel area;
    a spatial frequency detector for calculating a spatial frequency of a focusing image within said partial area after said autofocus operation is completed;
    a magnification determiner for determining a magnification of said focusing image in accordance with said spatial frequency; and
    a focusing-image display processor that modifies a resolution of said focusing image with respect to said magnification,
    wherein said focusing-image display processor displays a magnified and resolution-modified focusing image on a monitor, and
    wherein the display of said magnified and resolution-modified focusing image on said monitor is terminated when the display of said focusing image is canceled or a predetermined time has elapsed from the beginning of the display of said focusing image.

2. The focusing image display device as in claim 1, wherein said magnified and resolution-modified focusing image comprises said partial area.

3. The focusing image display device as in claim 1, wherein the magnification of said focusing image is performed as a focus point within said partial area at the center.

4. The focusing image display device as in claim 1, wherein said focusing-image display processor is driven only in a focus-verification assist mode.

5. A digital camera, comprising:
    an autofocus processor that performs an autofocus operation using an image within a partial area of an effective pixel area;
    a spatial frequency detector for calculating a spatial frequency of a focusing image within said partial area after said autofocus operation is completed;
    a magnification determiner for determining a magnification of said focusing image in accordance with said spatial frequency; and
    a focusing image display processor that modifies a resolution of said focusing image with respect to said magnification,
    wherein said focusing-image display processor displays a magnified and resolution-modified focusing image on a monitor, and
    wherein the display of said magnified and resolution-modified focusing image on said monitor is terminated when the display of said focusing image is canceled or a predetermined time has elapsed from the beginning of the display of said focusing image.

6. A method for displaying a focusing image, comprising:

performing an autofocus operation using an image within a partial area of an effective pixel area;

calculating a spatial frequency of a focusing image within said partial area after said autofocus operation is completed;

determining the magnification of said focusing image in accordance with said spatial frequency;

and modifying the resolution of said focusing image with respect to said magnification, displaying a magnified and resolution-modified focusing image on a monitor, and terminating the display of said magnified and resolution-modified focusing image on said monitor when the display of said focusing image is canceled or a predetermined time has elapsed from the beginning of the display of said focusing image.

* * * * *